(12) United States Patent
Guard

(10) Patent No.: US 6,547,080 B1
(45) Date of Patent: Apr. 15, 2003

(54) COLLAPSIBLE COLANDER FOR STRAINING AND RINSING

(75) Inventor: Tony Michael Guard, Union, KY (US)

(73) Assignee: Gravity, Incorporated, Cincinnati, OH (US)

( * ) Notice: Subject to any disclaimer, the term of this patent is extended or adjusted under 35 U.S.C. 154(b) by 0 days.

(21) Appl. No.: 09/526,824

(22) Filed: Mar. 16, 2000

(51) Int. Cl.$^7$ ............................................. B01D 35/28
(52) U.S. Cl. ..................... 210/464; 210/469; 210/470; 210/473; 210/498; 210/488; 210/489; 210/520; 209/926; 4/DIG. 19; D7/667; D7/668
(58) Field of Search ................................ 210/464–465, 210/469–470, 473, 455, 471, 498; D7/667–668; 211/41.3, 41.5–41.6, 85, 200–201; 4/286, 290, 292, 291, DIG. 19; 99/318–319; 108/166–167, 171; 220/4.21–4.25, 6, 9.2–9.3, 486–489, 495, 520; D32/55–56, 58; 209/926

(56) References Cited

U.S. PATENT DOCUMENTS

| | | | |
|---|---|---|---|
| 462,076 A | * | 10/1891 | Devoll |
| 702,525 A | * | 6/1902 | Arner et al. |
| 903,634 A | * | 11/1908 | Troemel |
| 958,857 A | * | 5/1910 | Dennis |
| 1,373,975 A | * | 4/1921 | Riddle |
| 1,389,908 A | * | 9/1921 | Shults |
| 1,587,693 A | * | 6/1926 | Beland et al. |
| 1,659,473 A | | 2/1928 | Rein |
| 1,810,855 A | * | 6/1931 | Rockmore |
| 3,091,339 A | | 5/1963 | Marra et al. .................. 210/232 |
| 3,198,540 A | * | 8/1965 | Averett |
| 3,300,048 A | * | 1/1967 | Pollock |
| 3,330,434 A | * | 7/1967 | Bromley |
| 3,813,025 A | * | 5/1974 | Solomon |
| 3,874,547 A | * | 4/1975 | Howard |
| 4,025,435 A | | 5/1977 | Shea .......................... 210/250 |
| 4,033,461 A | * | 7/1977 | Nevai |
| 4,779,794 A | * | 10/1988 | Moore |
| D324,902 S | * | 3/1992 | Kohler, Jr. et al. |
| 5,465,901 A | * | 11/1995 | Paine, Jr. |
| 5,505,850 A | | 4/1996 | Licari ......................... 210/464 |
| 5,862,535 A | | 1/1999 | Noga et al. .................... 4/286 |
| 6,170,676 B1 | * | 1/2001 | Patadia et al. |

FOREIGN PATENT DOCUMENTS

| | | | |
|---|---|---|---|
| JP | 9-71501 | * | 3/1997 |
| JP | 09071501 A | * | 3/1997 |
| JP | 10179288 A | * | 7/1998 |

* cited by examiner

Primary Examiner—W. L. Walker
Assistant Examiner—Marianne Ocampo
(74) Attorney, Agent, or Firm—Haverstock, Garrett & Roberts LLP

(57) ABSTRACT

Colander apparatus for straining and rinsing including a first rim portion and a second rim portion hingedly movable about an axis between a generally coplanar position and a collapsed or folded position wherein the rim portions are generally parallel or oriented at a small acute angle one to the other, the first and second rim portions when in the generally coplanar position defining a bowl opening. The colander apparatus further includes a bowl portion integrally formed with, attached to or otherwise supported by the first and second rim portions around the bowl opening in spanning relation thereto, the bowl portion including a plurality of openings therethrough. The colander apparatus further includes a rim portion extending around and defining a bowl opening, a bowl portion supported by the rim portion around the bowl opening so as to be suspended by the rim portion in or below the bowl opening, a first end portion can be hingedly connected to one end of the rim portion and a second end portion can be hingedly connected to an opposite end of the rim portion, the end portions being hingedly movable relative to the rim portion to positions angularly related thereto for supporting the colander apparatus on a generally horizontal surface with the bowl portion suspended above the surface.

15 Claims, 5 Drawing Sheets

COLLAPSIBLE COLANDER FOR STRAINING AND RINSING

TECHNICAL FIELD

This invention relates generally to kitchen utensils for straining and rinsing foods such as fruits, vegetables, pastas and the like, and more particularly, to an improved kitchen utensil known as a colander or strainer which is collapsible or foldable in a first manner for easier stowage and placement in a dishwasher or the like, and optionally foldable in another manner to provide a free standing bowl for holding fruit and the like.

BACKGROUND ART

It is well known to use colanders or strainers for such purposes as rinsing contaminants from fruit, vegetables and the like, and for draining water and other liquids from pastas and other foods after cooking. Typically, the known colanders have a structure which allows suspending the contents above the basin of a sink into which the rinse water or other liquid is to be drained to facilitate disposal of the liquid and prevent contamination of the contents. For instance, the colander or strainer can include a base which rests on the bottom of the sink basin. As another example, an element such as a hanger can extend upwardly from the colander or strainer for attachment to or looping over a water spigot. As a third alternative, the colander or strainer can be of sufficient extent in at least one direction such that opposite ends thereof can rest on opposite rim or edge portions of the sink for suspending a bowl portion of the colander or strainer in or over the basin.

Shortcomings found with colanders having a base include that if the base is placed in a contaminated sink basin, then onto a countertop, tabletop, or the like, the contaminant can be transferred to the countertop or tabletop. In the second instance, the means for suspension of the colander over the sink from the water spigot can slide off of or into the wrong position on the spigot, so as to interfere with easy placement of items into the colander. When suspended from the water spigot the colanders may also make it difficult to use the spigot. An important shortcoming of known colander of the third type is difficulty in stowage and placement in dishwashers and the like, due to the large extent.

Accordingly, the present invention is directed to overcoming one or more of the problems as set forth above.

DISCLOSURE Of THE INVENTION

In one aspect of the present invention, a collapsible or foldable colander apparatus for straining and rinsing is disclosed. The present colander includes hingedly connected first and second rim portions hingedly movable about an axis between a generally coplanar position and a collapsed or folded position wherein the collapsed or folded rim portions are generally parallel or oriented at a small acute angle one to the other, the first and second rim portions when in the generally coplanar position defining a bowl opening. The present colander further includes a bowl portion integrally formed with, attached to, or otherwise supported by the first and second rim portions around the bowl opening in spanning relation thereto, the bowl portion including a plurality of openings therethrough for the flow of liquid. The bowl portion can be of a generally rigid construction and can be split to facilitate the hinged movement, or can be for instance a flexible net so as to be collapsible or foldable, as desired.

In another aspect of the present invention, a colander apparatus is disclosed including a rim portion extending around and defining a bowl opening, a bowl portion integrally formed with, attached to, or otherwise supported by the rim portion around the bowl opening so as to be suspended by the rim portion in or below the bowl opening, a first end portion hingedly connected to one end of the rim portion and a second end portion hingedly connected to an opposite end of the rim portion, the end portions being hingedly movable relative to the rim portion to positions angularly related thereto for supporting the colander apparatus on a generally horizontal surface with the bowl portion suspended above the surface.

In another aspect of the invention a colander apparatus for straining and rinsing is disclosed, including first and second rim portions hingedly movable between a generally coplanar position and a collapsed or folded position wherein the rim portions are generally parallel or oriented at a small acute angle one to the other, the first and second rim portions when in the generally coplanar position defining a bowl opening; and a bowl including first and second bowl portions integrally formed with or attached to the first and second rim portions respectively around the bowl opening in spanning relation thereto, the bowl portions including a plurality of openings therethrough, and the bowl portions being connected to allow the hinged movement of the rim portions.

BEST MODE FOR CARRYING OUT THE INVENTION

Figure 1:
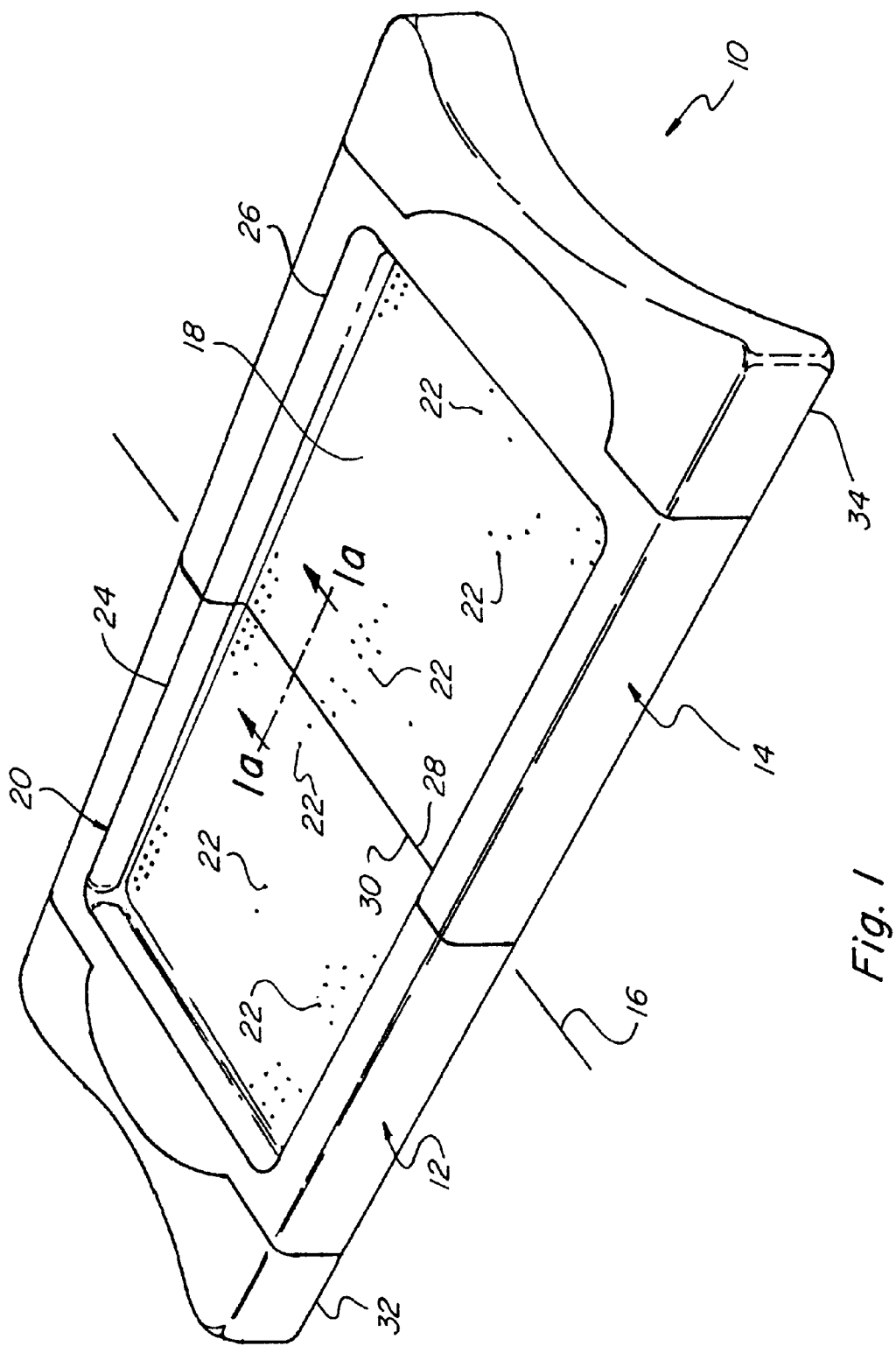
FIG. 1 is a perspective view of a colander apparatus according to the present invention.
Figure 1A:
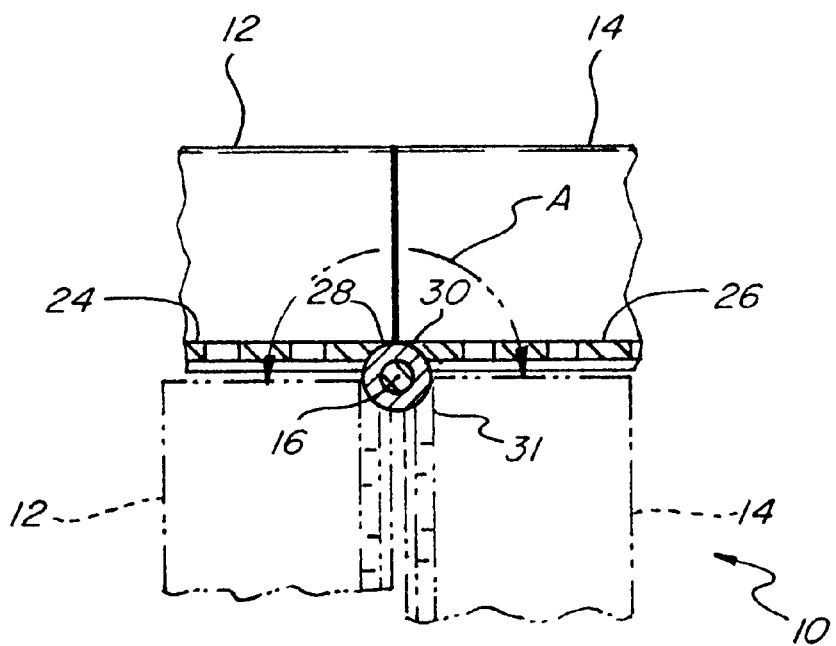
FIG. 1a is a cross-sectional view taken along line 1a—1a of FIG. 1 showing a hinge of the colander.

Turning now to the drawings, FIGS. 1 and 1a show a colander apparatus 10 constructed and operable according to the teachings of the present invention for straining, rinsing and the like. Colander apparatus 10 includes a first rim portion 12 and a second rim portion 14. First and second rim portions 12 and 14 are hingedly movable about an axis 16 between a generally coplanar position as shown, and a collapsed or folded position as illustrated in phantom in FIG. 1a wherein rim portions 12 and 14 are generally parallel or are oriented at a small acute angle one to the other. In the generally coplanar position, first and second rim portions 12 and 14 define a bowl opening 18. A bowl portion 20 is integrally formed with, attached to, or otherwise suspended in any conventional manner by first and second rim portions 12 and 14 around bowl opening 18 in spanning relation thereto, bowl portion 20 including a plurality of spaced smaller openings 22 therethrough for the flow of liquid or the like. Bowl portion 20 can be constructed of a thin, rigid material such as a metal or plastics sheet, or can be a net of a suitable metal or plastics or fabric material such as, but not limited to, a fabric mesh, so as to facilitate collapsing or folding the colander. The construction shown in FIGS. 1 and 1a includes a first rigid bowl portion 24 attached to first rim portion 12, and a second rigid bowl portion 26 attached to second rim portion 14, first and second rigid bowl portions 24 and 26 having edge portions 28 and 30, respectively, located in closely adjacent or abutting relation when the first and second rim portions 12 and 14 are in the generally coplanar position. Edge portions 28 and 30 are hingedly connected by a hinge 31 aligned and oriented along axis 16 as shown in FIG. 1a which allows the hinged movement of the bowl portions and rim portions for the collapsing or folding of the colander in the direction denoted by the arrow A, as just discussed. Here, it should be observed that axis 16 is located just beneath the bottom of rim portions 12 and 14 such that those portions do not bind or interfere with each other when the colander is collapsed or folded. It should also be understood that, as an alternative, one or both of the adjacent lower edges of rim portions 12 and 14 can be beveled or otherwise shaped or positioned so as to not be brought into contact when the colander is collapsed or folded, to allow the axis 16 to be located above the position shown, without departing from the scope of the present invention.

Figure 5:
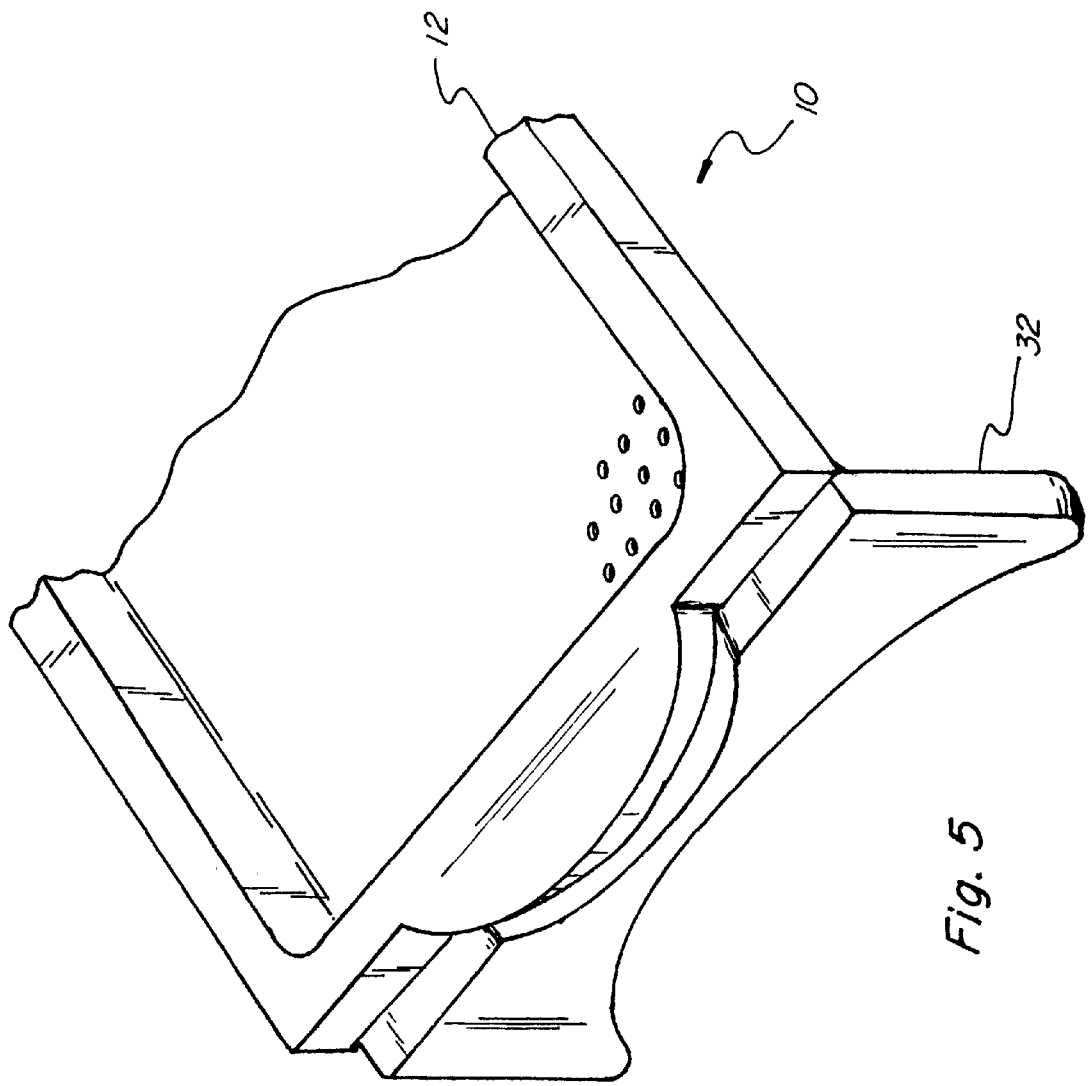
FIG. 5 is a fragmentary perspective view of the colander apparatus of FIGS. 3 and 4 shown with an end portion thereof in a folded position.

As an additional feature, first and second rim portions 12 and 14 include a first end portion 32 and a second end portion 34, respectively, the colander 10 being of sufficient extent as measured between end portions 32 and 34 to allow the end portions to be positionable on opposed rim portions of a sink for supporting colander apparatus 10 in spanning relation to a basin of the sink. End portions 32 and 34 can be optionally hingedly connected to first and second rim portions 12 and 14, respectively, so as to be hingedly movable between a position generally coplanar with first and second rim portions 12 and 14, respectively, and positions oriented at an acute angle thereto, end portions 32 and 34 having a sufficient extent so as to be capable of supporting colander apparatus 10 on a generally horizontal surface with bowl portion 20 spaced above the surface, as illustrated in FIG. 5, for use for holding fruit or other items (not shown).

Figure 2:
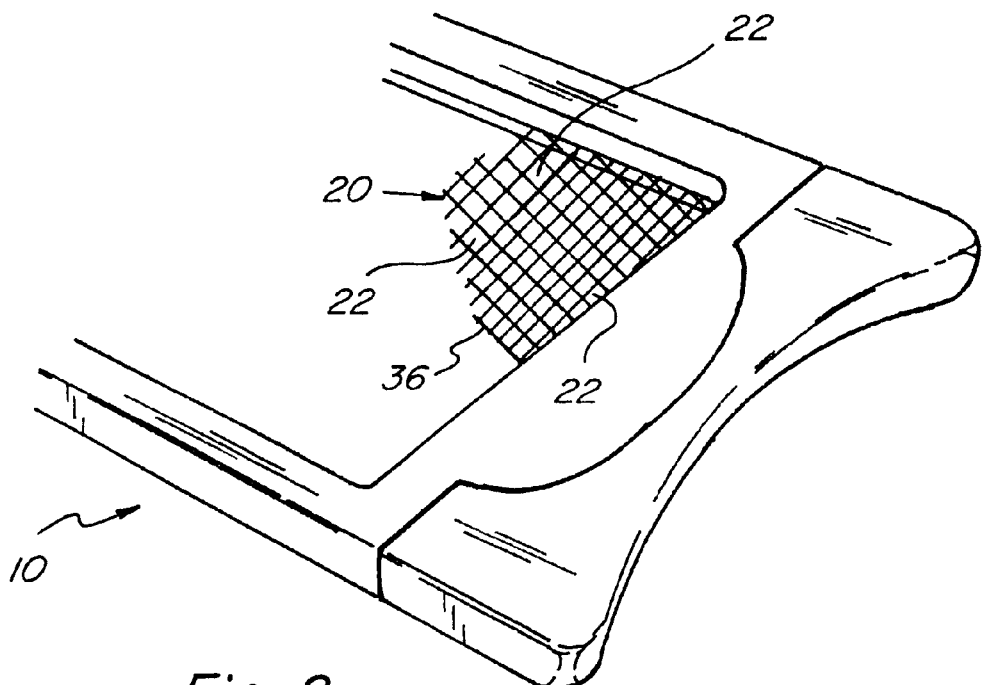
FIG. 2 is a fragmentary perspective view of the colander apparatus of FIG. 1 including an alternative bowl portion.

Turning to FIG. 2, colander apparatus 10 is shown including a bowl portion 20 comprised of a flexible net 36 of a metal or plastics material defining a plurality of openings 22 therethrough. Net 36 can have a generally concave or bowl-like shape which extends a desired distance below the rim portions 12 and 14 when in the generally coplanar position (FIG. 1), to facilitate receiving and holding a desired quantity of fruit, vegetables or the like to be rinsed, washed or the like. The flexibility of the net allows collapsing or folding of the colander in a desired manner. Also, because net 36 is flexible, the rim portions 12 and 14 are preferably directly hingedly connected using any suitable hinge construction, such as, but not limited to, the hinge constructions shown in FIGS. 3, 4, 6 and 7 discussed hereinbelow.

Figure 3:
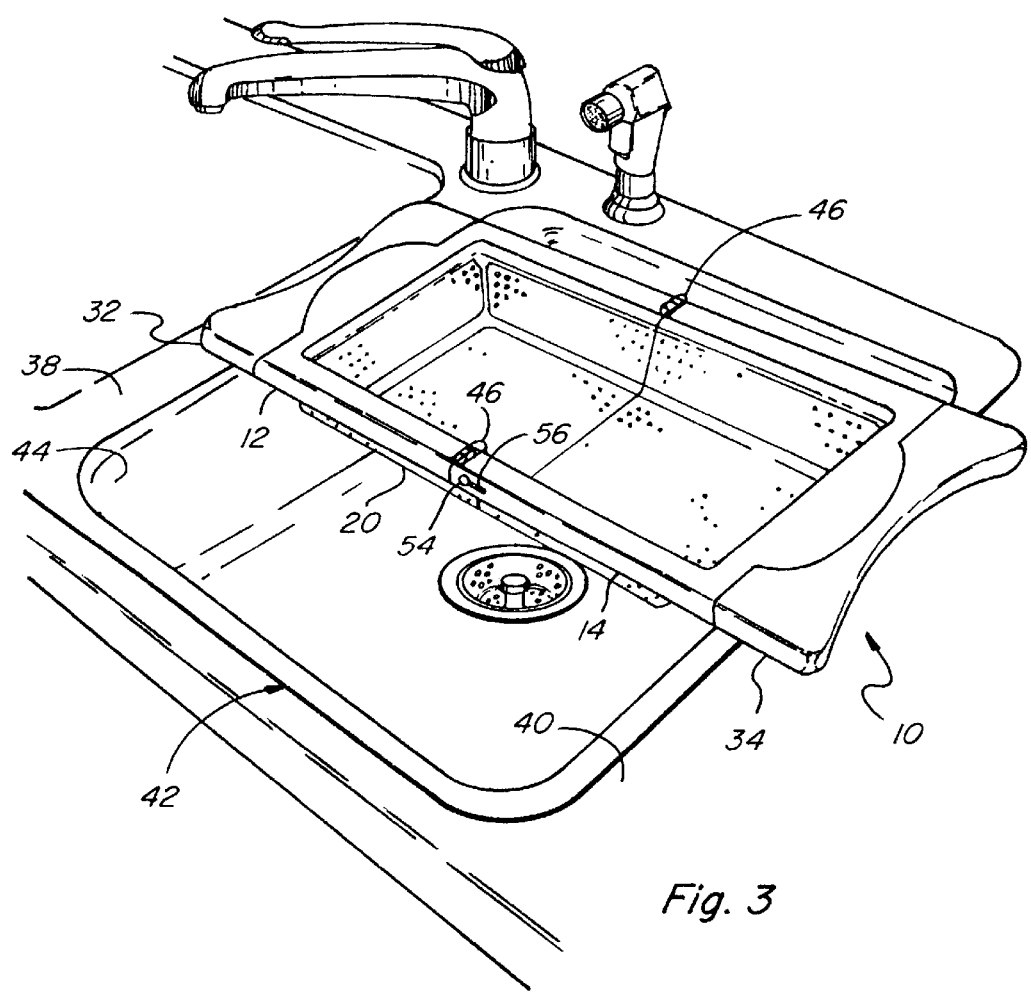
FIG. 3 is a perspective view of a colander apparatus according to the invention shown suspended over a sink basin.

FIG. 3 illustrates the longitudinal extent of colander apparatus 10 between end portions 32 and 34 to allow those portions to be supported by or rest on opposed rim portions 38 and 40 of a conventional kitchen sink 42, such that bowl portion 20 of the colander apparatus spans a basin portion 44 of the sink.

Figure 4:
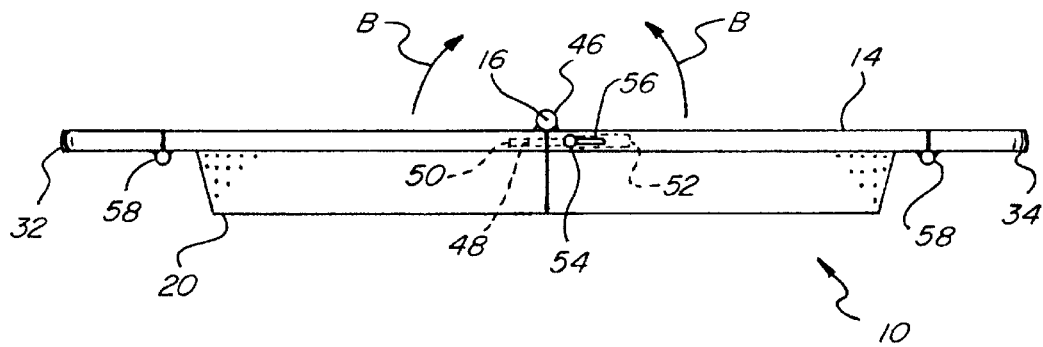
FIG. 4 is a side view of the colander apparatus of FIG. 3.

Referring also to FIG. 4, a side view of apparatus 10 is shown, including one embodiment of hinges 46 for hingedly connecting first and second rim portions 12 and 14 for hinged movement. Here, hinges 46 are located atop of rim portions 12 and 14 to allow hinged movement about axis 16 in the direction denoted by arrows B. To prevent inadvertent or undesired hinged movement of rim portions 12 and 14 so as to allow collapse of colander apparatus 10 for instance in a sink such as sink 42, or when apparatus is used as a bowl, colander apparatus 10 can include cooperatively engageable elements for holding first and second rim portions 12 and 14 in the coplanar position as shown. Here, a slidable pin 48 is shown positioned for slidable movement in aligned bore portions 50 and 52 located in rim portions 12 and 14. Pin 48 is movable between a position located in bore portion 50 as shown, and a retracted position withdrawn therefrom (not shown) by sliding a small button 54 connected to pin 48 through a slot 56 through rim portion 14. Here, it should also be recognized and understood that various other cooperatively engageable elements could likewise be used for holding rim portions 12 and 14 in the coplanar position as shown without departing from the scope of the present invention, including, but not limited to magnetic elements, latches, hooks, and the like.

Colander apparatus 10 is also shown in FIG. 4 including hinges 58 hingedly connecting end portions 32 and 34 to rim portions 12 and 14, respectively.

Referring also to FIG. 5, colander apparatus is shown with end portion 32 hingedly moved about hinges 58 (FIG. 4) or any other suitable hinges to a position angularly related to first rim portion 12 for use as a bowl. Here, it should be noted from FIG. 4 that end portions 32 and 34 are preferably of sufficient extent relative to the downward extent of bowl portion 20 such that when positioned as shown in FIG. 5, colander apparatus 10 can rest on end portions 32 and 34 on a horizontal surface such as a countertop or tabletop with the lowermost extremity of bowl portion 20 spaced above the surface.

Figure 6:
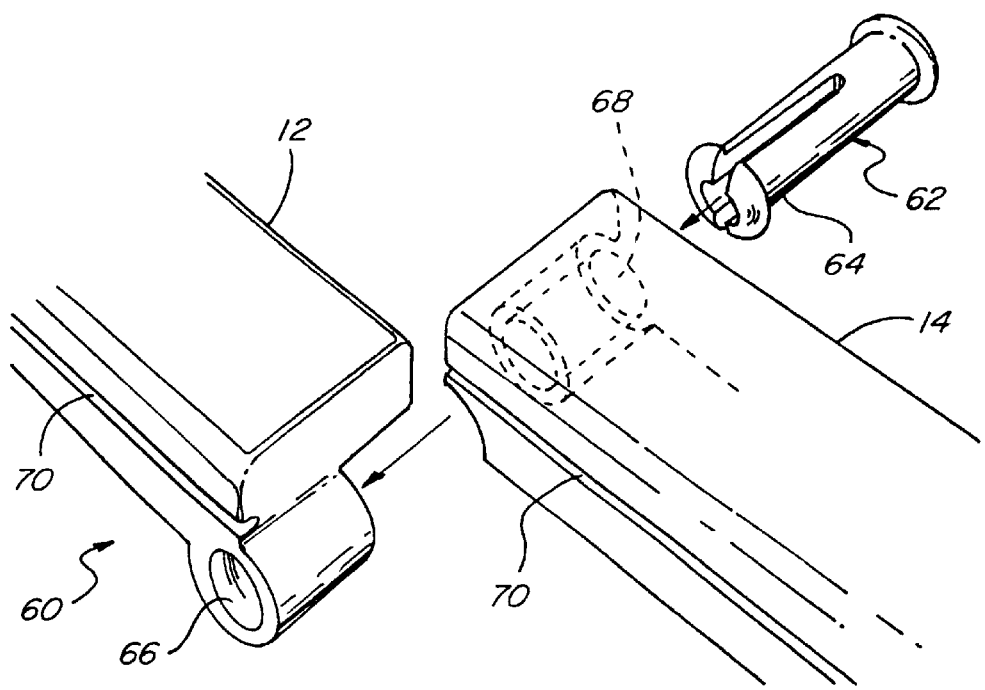
FIG. 6 is a fragmentary exploded perspective view showing one embodiment of a hinge element for the colander apparatus of FIGS. 1–5.
Figure 7:
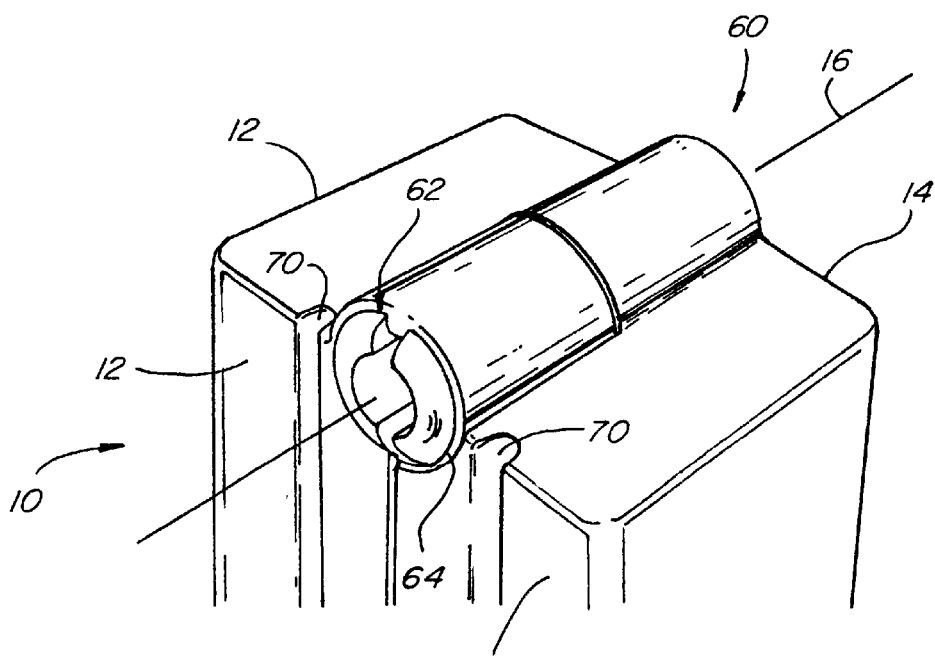
FIG. 7 is a fragmentary perspective view of the colander apparatus and hinge element of FIG. 6 shown assembled.

Referring also to FIGS. 6 and 7, it should be noted that first and second rim portions 12 and 14 can include alternative hinges, such as, but not limited to, hinges 60 shown, for hinged connection one to the other, and also for hinged connection of end portions 32 and 34 thereto, respectively. Hinges 60 each include a pin 62 including a compressible end 64, adapted to be cooperatively received and self-retained in four portions 66 and 68 through rim portions 12 and 14 along axis 16 (FIG. 7). With respect to the hinged connection of rim portions 12 and 14 one to the other, hinges 60 can be located beneath the rim portions to allow folding thereof in a downward direction denoted by the arrow A as shown in FIG. 1a, or in an upward direction as denoted by the arrows B in FIG. 4. In the first instance, in the event rigid bowl portions 24 and 26 are utilized, axis 16 could be aligned or coincident with edge portions 28 and 30 of the bowl portions, to allow hinged movement at least generally coincident therewith. Here, it should be understood that the bowl can have any desired downward extent, and that if the downward extent past the rim portion is large enough, placement of the hinge or hinges atop the rim portion or on the bowl portion may be required. In the event bowl portion 20 comprises a net, such as net 36, rim portions 12 and 14 can be hingedly movable either upwardly or downwardly, as desired, provided that net 36 is sufficiently large or stretchable to accommodate the hinged movement to the desired extent.

To facilitate attachment of bowl portion 20 (FIGS. 1 and 2), rim portions 12 and 14 can include a groove 70 around bowl opening 18 for receiving and holding a corresponding edge portion of the bowl portion.

For use, colander apparatus 10 can be deployed as shown in FIG. 4 over a sink basin or the like and fruit, vegetables, pasta or the like placed in bowl is portion 20 for rinsing or draining. Because the apparatus 10 is not suspended from the water spigot of the sink, the spigot is free to be used for other purposes, for instance for supplying water to an adjacent sink. The apparatus 10 can also be of sufficiently small extent as measured along axis 16 (FIG. 1) relative to the extent of a sink on which the apparatus is used to allow the sink to be used simultaneously for other purposes. When it is desired to use apparatus 10 as a bowl, end portions 32 and 34 can be folded down, and placed on a tabletop, countertop or the like. For storage or placement in an automatic dishwasher, rim portions 12 and 14 can be collapsed or folded.

Thus, there has been shown and described a novel invention in colander apparatus which overcomes many of the problems set forth above. It will be apparent, however, to those familiar in the art, that many changes, variations, modifications, and other uses and applications for the subject device are possible. All such changes, variations, modifications, and other uses and applications that do not depart from the spirit and scope of the invention are deemed to be covered by the invention which is limited only by the claims which follow.

What is claimed is:

1. Colander apparatus for straining and rinsing, comprising:
    a first rim portion;
    a second rim portion hingedly connected by at least one hinge to the first rim portion, the first and second rim portions being hingedly movable one relative to the other about an axis between a generally coplanar position and a folded position wherein the rim portions are generally parallel or oriented at a small acute angle one to the other, the first and second rim portions when in the generally coplanar position jointly extending around and defining a single bowl opening extending between the rim portions, the first and second rim portions including a first end portion and a second end portion located adjacent to opposite ends of the bowl opening, the end portions extending in opposite directions away from the bowl opening;
    a bowl portion integrally formed with or attached to the first and second rim portions around the bowl opening in spanning relation thereto, the bowl portion including a plurality of openings therethrough; and
    wherein the first and second rim portions when in the generally coplanar position have a combined extent in the plane thereof between the first and second end portions sufficient so as to span a sink, and the first and second rim portions include cooperatively engageable elements for holding them in the coplanar position such that the end portions are positionable on opposed rim portions of the sink with the first and second rim portions held in the coplanar position by the cooperatively engageable elements for supporting the bowl portion in spanning relation to a basin of the sink.

2. Colander apparatus of claim 1, wherein the bowl portion comprises a net.

3. Colander apparatus of claim 1, wherein the bowl portion comprises a first rigid bowl portion attached to the first rim portion and a second rigid bowl portion attached to the second rim portion, the first and second rigid bowl portions having edge portions spanning the bowl opening and located in closely adjacent position when the first and second rim portions are in the generally coplanar position.

4. Colander apparatus of claim 1, wherein the first and second end portions are hingedly connected by hinges to the first and second rim portions, respectively, and are hingedly movable between positions generally coplanar with the first and second rim portions, respectively, and positions oriented at an acute angle thereto, the end portions having a sufficient extent so as to support the colander apparatus on a generally horizontal surface with the bowl portion spaced from the surface.

5. Colander apparatus of claim 1, wherein the bowl portion comprises a thin, perforated material.

6. Colander apparatus for straining and rinsing, comprising in combination:
    a foldable rim portion extending around and defining a bowl opening;
    a bowl portion attached to the rim portion around the bowl opening so as to be supported in the bowl opening;
    a first end portion hingedly connected by at least one hinge to one end of the rim portion and a second end portion hingedly connected by at least one hinge to an opposite end of the rim portion, the end portions being hingedly movable relative to the rim portion to positions angularly related thereto for supporting the colander apparatus on a generally horizontal surface with the bowl portion spaced from the surface.

7. Colander apparatus of claim 6, wherein the rim portion includes a first rim portion and a second rim portion hingedly connected by hinges so as to be hingedly movable about an axis between a generally coplanar position and a folded position wherein the first and second rim portions are generally parallel or oriented at a small acute angle one to the other.

8. Colander apparatus of claim 6, wherein the bowl portion comprises a net.

9. Colander apparatus of claim 6, wherein the bowl portion comprises a thin, perforated material.

10. Colander apparatus for straining and rinsing, consisting of:
    a first rim portion;
    a second rim portion, the first and second rim portions being hingedly movable one relative to the other between a generally coplanar position and a collapsed or folded position wherein the rim portions are generally parallel or oriented at a small acute angle one to the other, the first and second rim portions when in the generally coplanar position extending around and defining a single, continuous bowl opening, the first and second rim portions including a first end portion and a second end portion located adjacent to opposite ends of the bowl opening, the end portions extending in opposite directions away from the bowl opening; and
    a bowl including first and second bowl portions integrally formed with or attached to the first and second rim portions respectively around the bowl opening in spanning relation thereto, the bowl portions including a plurality of openings therethrough, and the bowl portions being connected by at least one hinge to allow the hinged movement of the rim portions, wherein the first and second rim portions when in the generally coplanar position have a combined extent in the plane thereof between the first and second end portions sufficient so as to span a sink, the first and second rim portions including ends which are in abutting contact when the rim portions are in the generally coplanar position so as to hold the rim portions in the generally coplanar position when the end portions of the rim portions extending away from the bowl opening are located and supported on opposed rim portions of a sink with the bowl portions spanning a basin of the sink located between the opposed rim portions thereof.

11. Colander apparatus of claim 10, wherein the bowl comprises a net.

12. Colander apparatus of claim 10, wherein the bowl portions are hingedly connected by hinges for relative rotation about an axis.

13. Colander apparatus for straining and rinsing, consisting of:
- a first rim portion;
- a second rim portion, the first and second rim portions being hingedly connected by at least one hinge for relative movement thereof between a generally coplanar position and a folded position wherein the rim portions are generally parallel or oriented at a small acute angle one to the other, the first and second rim portions when in the generally coplanar position extending around and defining a single, continuous bowl opening, the first and second rim portions including a first end portion and a second end portion located adjacent to opposite ends of the bowl opening, the end portions extending in opposite directions away from the bowl opening; and
- a bowl including first and second bowl portions integrally formed with or attached to the first and second rim portions respectively around the bowl opening in spanning relation thereto, the bowl portions including a plurality of openings therethrough, the first and second rim portions when in the generally coplanar position having a combined extent in the plane thereof between the first and second end portions sufficient so as to span a sink, the first and second rim portions including ends which are in abutting contact when the rim portions are in the generally coplanar position so as to hold the rim portions in the generally coplanar position when the end portions of the rim portions extending away from the bowl opening are located and supported on opposed rim portions of a sink with the bowl portions spanning a basin of the sink located between the opposed rim portions thereof.

14. Colander apparatus for straining and rinsing, comprising:
- a first rim portion;
- a second rim portion hingedly connected by at least one hinge to the first rim portion, the first and second rim portions being hingedly movable one relative to the other about an axis between a generally coplanar position and a folded position wherein the rim portions are generally parallel or oriented at a small acute angle one to the other, the first and second rim portions when in the generally coplanar position jointly extending around and defining a single bowl opening extending between the rim portions;
- a bowl portion attached to the first and second rim portions around the bowl opening in spanning relation thereto, the bowl portion including a plurality of openings therethrough; and
- wherein the first and second rim portions have a combined extent in the plane thereof when in the generally coplanar position sufficient so as to span a sink, the first and second rim portions including a first end portion and a second end portion respectively, the end portions being positionable on opposed rim portions of the sink for supporting the colander apparatus in spanning relation to a basin of the sink, and the first and second end portions being connected by hinges to the first and second rim portions, respectively, and are hingedly movable between positions generally coplanar with the first and second rim portions, respectively, and positions oriented at an acute angle thereto, the end portions having a sufficient extent so as to support the colander apparatus on a generally horizontal surface with the bowl portion spaced from the surface.

15. Colander apparatus for straining and rinsing, consisting of:
- a first rim portion;
- a second rim portion connected by at least one hinge to the first rim portion, the first and second rim portions being hingedly movable between a generally coplanar position and a collapsed or folded position wherein the rim portions are generally parallel or oriented at a small acute angle one to the other, the first and second rim portions when in the generally coplanar position extending around and defining a single, continuous bowl opening;
- to the a bowl including first and second bowl portions integrally formed with or attached to the first and second rim portions respectively around the bowl opening in spanning relation thereto, the bowl portions including a plurality of openings therethrough, and the bowl portions being connected to allow the hinged movement of the rim portions; and
- wherein the first and second rim portions include a first end portion and a second end portion, respectively, the end portions being positionable on opposed rim portions of a sink for supporting the colander apparatus in spanning relation to a basin of the sink; and
- wherein the first and second end portions are hingedly connected by hinges to the first and second rim portions, respectively, and are hingedly movable between positions generally coplanar with the first and second rim portions, respectively, and positions oriented at an acute angle thereto, the end portions having a sufficient extent so as to support the colander apparatus on a generally horizontal surface with the bowl portion spaced from the surface.

* * * * *